(12) United States Patent
Jacobsen et al.

(10) Patent No.: US 11,067,056 B2
(45) Date of Patent: Jul. 20, 2021

(54) WIND TURBINE BLADE BUSHING SYSTEM

(71) Applicant: LM WP PATENT HOLDING A/S, Kolding (DK)

(72) Inventors: Torben Krogsdal Jacobsen, Lunderskov (DK); Roel Schuring, Kolding (DK); Dhinagaran Ramachandran, Bangalore (IN); Madhava Prasad Koteshwara, Karnataka (IN); Utsa Majumder, Bangalore (IN); Casper Kildegaard, Kolding (DK); Madhusudhan N Veerappa, Karnataka (IN); Torben Lindby, Gesten (DK); Prajna Aachar, Karnataka (IN); Morten Olesen, Lunderskov (DK); Aanchal Saini, Kolding (DK)

(73) Assignee: LM WP PATENT HOLDING A/S, Kolding (DK)

( * ) Notice: Subject to any disclaimer, the term of this patent is extended or adjusted under 35 U.S.C. 154(b) by 585 days.

(21) Appl. No.: 15/118,698

(22) PCT Filed: Feb. 17, 2015

(86) PCT No.: PCT/EP2015/053314
§ 371 (c)(1),
(2) Date: Aug. 12, 2016

(87) PCT Pub. No.: WO2015/124568
PCT Pub. Date: Aug. 27, 2015

(65) Prior Publication Data
US 2017/0045032 A1 Feb. 16, 2017

(30) Foreign Application Priority Data
Feb. 18, 2014 (GB) .................................. 1402830

(51) Int. Cl.
*F03D 1/06* (2006.01)
(52) U.S. Cl.
CPC ......... *F03D 1/0658* (2013.01); *F03D 1/0675* (2013.01); *F05B 2250/292* (2013.01);
(Continued)
(58) Field of Classification Search
CPC ...... F03D 1/0658; F03D 1/0691; F03D 80/70; F05B 2260/301
See application file for complete search history.

(56) References Cited

U.S. PATENT DOCUMENTS 9,180,630 B2 * 11/2015 Madsen ................ B29C 70/541
2014/0127028 A1 * 5/2014 Feigl ..................... F03D 1/0658
416/222

* cited by examiner

*Primary Examiner* — David E Sosnowski
*Assistant Examiner* — Sabbir Hasan
(74) *Attorney, Agent, or Firm* — Nath, Goldberg & Meyer; Jerald L. Meyer; Tanya E. Harkins

(57) ABSTRACT

A wind turbine blade bushing system for arrangement in a root end of a wind turbine blade is described. The wind turbine blade bushing system comprises a threaded element for retaining a mounting bolt for a wind turbine blade, the threaded element being formed from a first material; and an anchor element for arrangement at the root end of the wind turbine, wherein the anchor element acts to at least partly retain the threaded element in the wind turbine blade, the anchor element being formed from a second material. The first material has a higher strength and higher fracture toughness than the second material.

7 Claims, 7 Drawing Sheets

(52) U.S. Cl.
CPC ... *F05B 2250/611* (2013.01); *F05B 2260/301* (2013.01); *F05B 2280/50* (2013.01); *Y02E 10/72* (2013.01)

WIND TURBINE BLADE BUSHING SYSTEM

This is a National Phase Application filed under 35 U.S.C. 371 as a national stage of PCT/EP2015/053314, filed Feb. 17, 2015, an application claiming the benefit of Great Britain Application No. 1402830.2, filed Feb. 18, 2014, the content of each of which is hereby incorporated by reference in its entirety.

TECHNICAL FIELD

The present invention relates to wind turbine blade bushing systems, methods of manufacturing such bushing systems, and wind turbine blades comprising such bushing systems.

BACKGROUND

Wind turbine blades and thereby also the root region thereof are often made by assembling two blade halves essentially corresponding to the suction side and the pressure side, respectively, along the chord plane. However, the blades may also be moulded in their entirety by so-called hollow moulding.

The root region comprises layers of fibres forming an outer layer and an inner layer between which fastening members in the form of bushings are placed. The bushings are used to mount the wind turbine blades to a blade bearing or pitch bearing at the rotor hub of the wind turbine by use of mounting bolts. Separately formed inserts may be placed between each pair of adjacent bushings, whereby the bushings are mutually separated by the inserts. The known inserts are made of glass fibres embedded in a suitable resin.

Current bushings are manufactured via a plurality of milling or turning operations starting from relatively large steel blank. The resulting bushing, combined with standard high-strength bolts provides a strong connection between the blade and the blade bearing or pitch bearing of the wind turbine. However, the cost of bushings is relatively high as the milling and turning operations are expensive operations with a high amount of waste product. Further, since the bushing is made from a single blank, the entire bushing has to be made from a material that has steel-grade capable of picking up the force of the bolts. This overall, makes the bushings relatively expensive. Since a modern wind turbine blade comprises a plurality of bushings and often between 64 and 128, the bushings are source to a significant part of the overall cost of manufacturing the wind turbine blade.

DISCLOSURE OF THE INVENTION

Therefore, it is an object of the invention to obtain a wind turbine blade bushing system and methods of manufacturing such bushing systems, which overcome or ameliorate at least one of the disadvantages of the prior art or which provide a useful alternative.

In a first aspect, the invention provides a wind turbine blade bushing system for arrangement in a root end of a wind turbine blade, the wind turbine blade bushing system comprising:
  a threaded element for retaining a mounting bolt for a wind turbine blade, and
  an anchor element for arrangement at the root end of the wind turbine, wherein the anchor element acts to at least partly retain the threaded element in the wind turbine blade.

Thus, it is seen that the bushing system according to the invention is made of two separate parts, which may simplify manufacturing methods and lowering costs, since the parts to a higher degree may be made from standard components and the degree of post machining may be minimised. Advantageously, the threaded element is connected to the anchor element.

According to a preferred embodiment, the invention provides a wind turbine blade bushing system for arrangement in a root end of a wind turbine blade, the wind turbine blade bushing system comprising:
  a threaded element for retaining a mounting bolt for a wind turbine blade, the threaded element being formed from a first material; and
  an anchor element for arrangement at the root end of the wind turbine, wherein the anchor element acts to at least partly retain the threaded element in the wind turbine blade, the anchor element being formed from a second material,
  wherein the first material has a higher strength and higher fracture toughness than the second material.

Since the threaded element forms the primary interface with a mounting bolt, the use of a higher quality/strength material to form the threaded element allows the bushing system to handle the transfer of the relatively high root end pulling forces to the mounting bolt, without risk of fracture or pull-out. The second material, by contrast, primarily acts to anchor the bushing system in the root end of the blade. As the anchoring effect is primarily dependent on the surface area between the anchor element and the blade body and the bonding to the laminate structure of the wind turbine blade root, the use of a lower-quality material allows for the overall cost of the bushing system to be minimized, as the higher quality, relatively high-cost material can be used in that area of the bushing system where it is most effective, while the less critical function of anchoring the bushing system in a blade can be easily fulfilled through the use of a larger quantity of relatively low cost material.

It is recognised that the bushing system is adapted to take up the bolt. Accordingly, the bushing system comprises a bore, and the threaded element in general comprises an inner threading to engage an outer threading of the bolt.

In terms of the invention, "higher strength" and "higher fracture toughness" material here means that the first material may have a higher quality or grade than the second material. The first material may for instance be made of a harder material than the second material, e.g. by the first material being higher grade steel, and the second material being a lower grade steel.

In general, the first material may be a first metal, and the second material be a second metal, e.g. a first grade metal and a second, lower grade metal.

The threaded element and the anchor element are preferably connected via a permanent connection, such as adhesive, soldering or weld connection or a threaded connection, such that the bushing system may be arranged as a unitary element in the wind turbine blade.

In the following, a number of embodiments are described, which are applicable to the first aspect of the invention and to the preferred embodiment, where the bushing system is made from two different materials.

In an advantageous embodiment, the threaded element is a bolt-receiving nut for receiving a mounting bolt for a wind turbine blade, and the anchor element comprises a tubular member for arrangement at the root end of the wind turbine blade so as to retain the tubular member in a wind turbine blade body, wherein the tubular member acts to at least partly retain the bolt-receiving nut in the wind turbine blade. Thereby, the anchor element can be made from a relative cheap standard made tubular material, e.g. a pipe, whereas the more critical threaded element can be made from a simple high-strength bolt-receiving nut.

The bolt-receiving nut may advantageously be arranged in an interior part of the tubular member. Accordingly, the nut is retained within the tubular member.

In one embodiment, the bolt-receiving nut is retained in the tubular member by the tubular member being crimped or press-formed in a region of said tubular member to retain the bolt-receiving nut at said region.

In another embodiment, the tubular member comprises a first open end to receive a bolt, wherein an internal chamber of the tubular member comprises a first constriction between a location of the bolt-receiving nut in the tubular member and the first open end so as to retain the bolt-receiving nut in the tubular member. Thus, the constriction is adapted to retain or take up the nut.

In general, when referring to the first end of the various parts, this first end corresponds to the proximal end relative to root end of blade.

In a simple embodiment, the bolt-receiving nut may be connected to an end face of the tubular member, e.g. by welding or soldering. The different parts of the bushing system may for instance be connected via friction welding.

In addition or alternatively, the tubular member comprises a second end opposed to the first end, wherein the internal chamber comprises a second constriction between the location of the bolt-receiving nut in the tubular member and the second end so as to retain the bolt-receiving nut in place relative to the second end of the tubular member. Thus, the second constriction, preferably in conjunction with the first constriction, is adapted to retain the nut, e.g. in a cavity having a shape accommodating the shape of the nut.

In general, when referring to the second end of the various parts, this second end corresponds to the distal end relative to the root end of blade.

The bolt-receiving nut may also be connected between two tubular members. Accordingly, the bolt-receiving nut is arranged between the second (or distal) open end of a first tubular member and a first (or proximal) open end of a second tubular member.

The tubular member may be an open-ended pipe element. Accordingly, the tubular member may be made from a standard component.

According to an advantageous embodiment, a tapered or wedge-shaped element is arranged at a distal part of the tubular member. The tapered or wedge-shaped part may in principle also be open, but advantageously it is closed. The tapered or wedge-shaped part ensures that a smooth transition in stiffness is obtained in the longitudinal direction of the blade shell to the laminate of the wind turbine blade. The tapered or wedge shaped part may be integrally formed with the tubular member or provided as a separate element.

In another advantageous embodiment, the threaded element comprises an inner bore provided with an internal thread, the anchor element comprises a threaded spigot at a first end of the anchor element, the internal thread is arranged to receive at least a portion of a mounting bolt, and the internal thread is further arranged to receive at least a portion of the threaded spigot such that the anchor element acts to at least partly retain the threaded element in the wind turbine blade. Again, the anchor element comprising the threaded spigot may advantageously be made from a lower quality and cheaper material than the threaded element, thereby lowering the unit cost without compromising the strength of the overall bushing system.

The anchor element may comprise a tapered or wedge-shaped member. Again this member has the purpose of providing smooth stiffness transition to the laminate structure of the wind turbine blade.

In yet another advantageous embodiment, the threaded element is made from a nut element comprising an inner bore having an internal thread to receive and retain a mounting bolt, and the anchor element comprises a bore having at least a first open end to receive the mounting bolt, wherein the nut element is held in the bore of the anchor element, such that the anchor element acts to retain the nut element in a wind turbine blade.

The anchor element may be provided with a blind bore extending from the first open end to a second closed end, wherein the anchor element further comprises a tapered or wedge-shaped portion at the second closed end. Accordingly, it is seen that the part with the open bore and the tapered or wedge-shaped portion may be formed as a single integral part.

In one advantageous embodiment, the nut element further comprises an external thread, wherein an internal thread is defined on a least a portion of the bore in the anchor element, wherein said internal thread of said anchor element is arranged to receive at least a portion of said external thread of said nut element. Accordingly, the nut element is retained by the thread connection in the bore of the anchor element.

In another advantageous embodiment, the anchor element comprises a first portion and a second portion, the first portion substantially comprising a tubular element having an inner through bore, the second portion substantially comprising a tapered or wedge-shaped element, wherein said first portion and said second portion are joined to form said anchor element. The first portion and said second portion may advantageously be joined via or at said nut element. Accordingly, the anchoring element is assembled from two separately manufactured and preferably standard products. The two parts may be assembled such that the assembly retains the nut element and/or the nut element provides the assembly of the two parts.

In one embodiment, the first portion comprises a through bore having an internal thread defined in the bore, the second portion comprises a blind bore having an internal thread defined in the bore, and the nut element further comprises an external thread, wherein the respective internal threads of the first and second portions are received on the external thread of the nut element to connect the first and second portions to the nut element. This provides a particular simple assembly, where the bushing system is assembled from three separately manufactured parts and assembled to a strong bushing system.

The first and/or second portions may for instance be press-formed or forged onto the nut element to join the first and second portions to the nut element.

In another advantageous embodiment, the anchor part comprises a through-going bore from a first end for receiving a mounting bolt to a second end, wherein the through-going bore at the second end comprises an internal thread, and wherein the threaded element is connected via an external thread or press-fitted into the internal thread of the through going bore. A tapered or wedge-shaped element comprising a threaded spigot at a first end of said element may be connected to the second end of the anchor part via the internal thread of the through-going bore. As opposed to the earlier embodiment, the tapered or wedge-shaped element is thus connected to the anchor element instead of the threaded element.

In one embodiment, the anchor part comprises at least a first tubular part surrounding a second tubular part, e.g. an inner pipe and an outer pipe. Thereby, it is possible to manufacture a thicker bushing via a number of standard pipes. The inner pipe and the outer pipe may for instance be connected via thermal fitting or via connecting threads. A collar may be used for retaining the threaded part for retaining a mounting bolt for a wind turbine blade.

In the following, a number of embodiments are described where the features may advantageously be combined with the first aspect or the afore-mentioned preferred embodiment, alternatively alone.

In one embodiment, the bushing system comprises a bushing mouth, which is made from a third material. Again, the third material may have a higher strength and higher fracture toughness than the remainder of the bushing material. This will ease the machining of the rest of the bushing, e.g. the formation of a corrugated exterior surface and reduce material cost. It is seen that the idea may be broadened to a bushing, comprising a bushing mouth (or receiving opening), which is made of a material having a higher strength and higher fracture toughness than the remaining part of the bushing.

In a particularly advantageous embodiment, the anchor element comprises a metallic pipe, preferably formed from any one or a combination of the following: steel, aluminium, copper. The pipe may be a welded pipe, an extruded pipe, etc. The different parts of the bushing system may for instance be connected via friction welding.

The anchor element has an outer circular cross-section. Alternatively, the tubular member may have any other suitable cross-sectional shape, e.g. oval, square, rectangular, etc.

The invention also provides a wind turbine blade bushing system comprising an external surface, said external surface has a surface effect to improve the retention of said bushing system in the root end of a wind turbine blade. The surface effect may be applied to the anchor member or tubular member of the first aspect of the invention.

The surface effect may comprise any combination of grooves, undulations, threads, corrugations, ribs, or ripples on the external surface of the bushing system.

In a generic embodiment, the surface effect comprises a shaped cross-sectional profile on the external surface, wherein a first series of undulations having a first spatial frequency are provided on the external surface of the tubular member, and wherein said first series of undulations are modulated with a second series of undulations having a second spatial frequency, said second spatial frequency being higher than said first spatial frequency. This embodiment provides a better anchoring in the surrounding laminate structure of the root section of the wind turbine blade.

It will be understood that that said undulations extend along the longitudinal direction of the tubular member.

In an advantageous embodiment, a height or amplitude of the first series of undulations is at least the same size as a height or amplitude of the second series of undulations.

The invention also provides a wind turbine blade comprising a tip end a root end, the wind turbine blade comprising a plurality of bushing systems located at the root end to receive a mounting bolt. The bushings systems may be any of the afore-mentioned embodiments. Accordingly, the bushing system may comprise: a threaded element for retaining a mounting bolt for a wind turbine blade, the threaded element being formed from a first material; and an anchor element for arrangement at the root end of the wind turbine, wherein the anchor element acts to at least partly retain the threaded element in the wind turbine blade, the anchor element being formed from a second material, wherein the first material has a higher strength than the second material.

In general, it is recognised that the invention pertains to modern wind turbine blades, which are made of a composite structure. Accordingly, the invention in greater detail provides (with reference to FIGS. 1 and 2):

A wind turbine blade (10) for a rotor of a wind turbine (2), said rotor comprising a hub (8), from which the blade (10) extends substantially in a radial direction when mounted to the hub (8), the wind turbine blade including a shell structure of a fibre-reinforced composite material comprising fibres embedded in a polymer matrix, the blade having a longitudinal direction (r) with a tip end (14) and a root end (16) and a transverse direction as well as having a blade length (L), the blade further comprising:

a profiled contour including a pressure side and a suction side, as well as a leading edge (18) and a trailing edge (20) with a chord having a chord length (c) extending there between, the profiled contour, when being impacted by an incident airflow, generating a lift, wherein the profiled contour comprises:
a root region (30) comprising a root end face (29),
an airfoil region (34) having a lift-generating profile furthest away from the hub, and
optionally a transition region (32) between the root region (30) and the airfoil region (34), wherein
the root region comprises a ring-shaped cross section with an outer surface (36) and an inner surface (35), wherein the root region (30) comprises a plurality of bushing systems (40) embedded mutually spaced apart in the fibre-reinforced polymer so as to substantially follow a circumference of the root region (30) and allow access from the outside to the bushing systems (40) used for mounting the blade (10) to the hub (8),
the bushing systems (40) comprise a first end (44) arranged at the root end face, a second end (46) opposite the first end (44) thereof and an outer periphery (42), wherein the wind turbine blade bushing systems comprise:
a threaded element for retaining a mounting bolt for a wind turbine blade, the threaded element being formed from a first material; and
an anchor element for arrangement at the root end of the wind turbine, wherein the anchor element acts to at least partly retain the threaded element in the wind turbine blade, the anchor element being formed from a second material,
wherein the first material has a higher strength and higher fracture toughness than the second material.

Again, the blade bushing systems may be exchanged with any of the afore-mentioned embodiments.

In one advantageous embodiment, the threaded element is a bolt-receiving nut, and the anchor element comprises: a first tubular element having opposed first and second open ends, the tubular element comprising a body having a through bore extending between the first and second open ends, wherein the tubular element is embedded in the wind turbine blade at said root end such that said first open end is arranged to receive a mounting bolt at the root end of the blade, and wherein the bolt-receiving nut is arranged adjacent said second open end of first tubular element, wherein said nut bears against the body of said tubular element at said second end, said tubular element at least partly retaining said bolt-receiving nut in said wind turbine blade. This effect may simply be achieved by the tubular element against the bolt-receiving nut so as to retain the nut in the tubular element.

The bushing system may further comprise a second tubular element having a first open end, wherein said bolt-receiving nut is arranged between said second open end of said first tubular element and said first open end of said second tubular element, such that the first tubular element, the bolt-receiving nut, and the second tubular element together form a continuous bushing chamber to receive a mounting bolt.

Alternatively, the bushing system may be any of the afore-mentioned embodiments.

The invention also provides a sectionised wind turbine bushing system comprising at least a first longitudinal part connected to a second longitudinal part. Thus, it is recognised that the bushing system is made up from a plurality of sections, which are mutually connected. The first part may for instance comprise a threaded element for retaining a mounting bolt. The second longitudinal part may be an anchor element. The first longitudinal part may be made of a first material. The second longitudinal part may be made of a second material. The first material may have a higher strength and fracture toughness that the second material. Thus, the invention provides a bushing system, which is modular. Thereby, the bushing system may comprise standardised parts for one part of the bushing system, whereas customised parts may be used for other parts of the bushing system, e.g. for a particular wind turbine blade type. This embodiment may advantageously be combined with the embodiment, where the bushing system further comprises a separate manufactured mouth piece.

The invention also provides a method of manufacturing a wind turbine blade bushing system, wherein the method comprises the steps of:
a) providing a threaded element for retaining a mounting bolt for a wind turbine blade, the threaded element being formed from a first material;
b) providing an anchor element for arrangement at the root end of the wind turbine, the anchor element being formed from a second material, and
c) fitting the threaded element to the anchor element such that the anchor element acts to at least partly retain the threaded element in the wind turbine blade.

The first material may advantageously have a higher strength and higher fracture toughness than the second material.

In an advantageous embodiment, the anchor element comprises a tubular member and the threaded element comprises a bolt-receiving nut, and wherein the bolt receiving nut is arranged in and fitted to an interior part of the tubular member.

In another advantageous embodiment, the fitting in step c) is carried out by at least a portion of the exterior of said tubular member to secure said bolt-receiving nut in the interior of said tubular member to form a bushing system to receive a mounting bolt for a wind turbine blade.

The method may advantageously comprise the step of surface treating an external surface of said tubular member to improve the retention of said bushing system in a root end of a wind turbine blade. The step of surface treating may comprise providing grooves, undulations, treads on external surface. The surface treating may comprise any of the following steps: press-forming, milling, forging, turning, etc.

BRIEF DESCRIPTION OF THE DRAWINGS

The invention is explained in detail below with reference to embodiments shown in the drawings, in which.

DETAILED DESCRIPTION OF THE INVENTION

Figure 1:
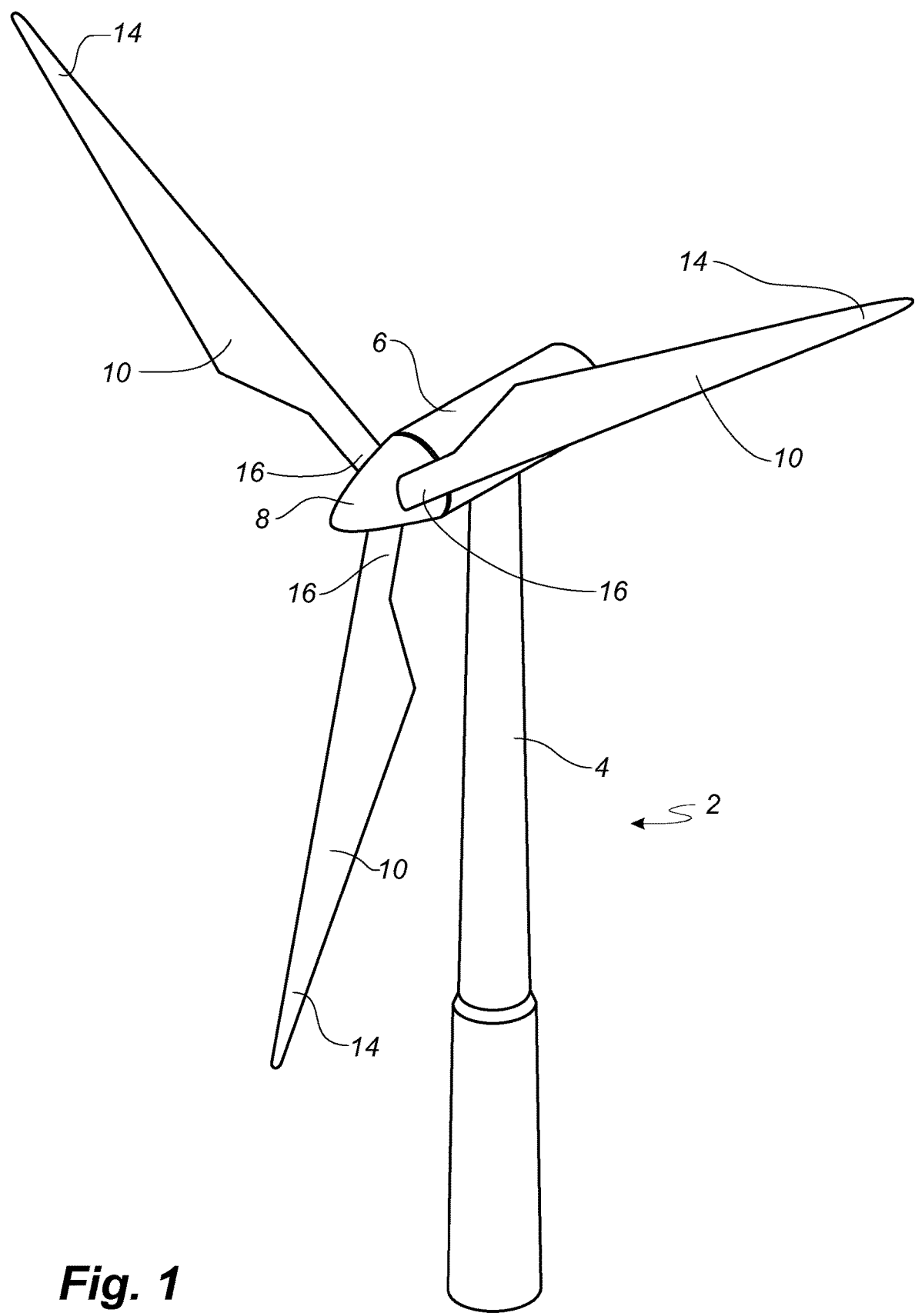
FIG. 1 shows a wind turbine.

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 farthest from the hub 8. The rotor has a radius denoted R.

Figure 2:
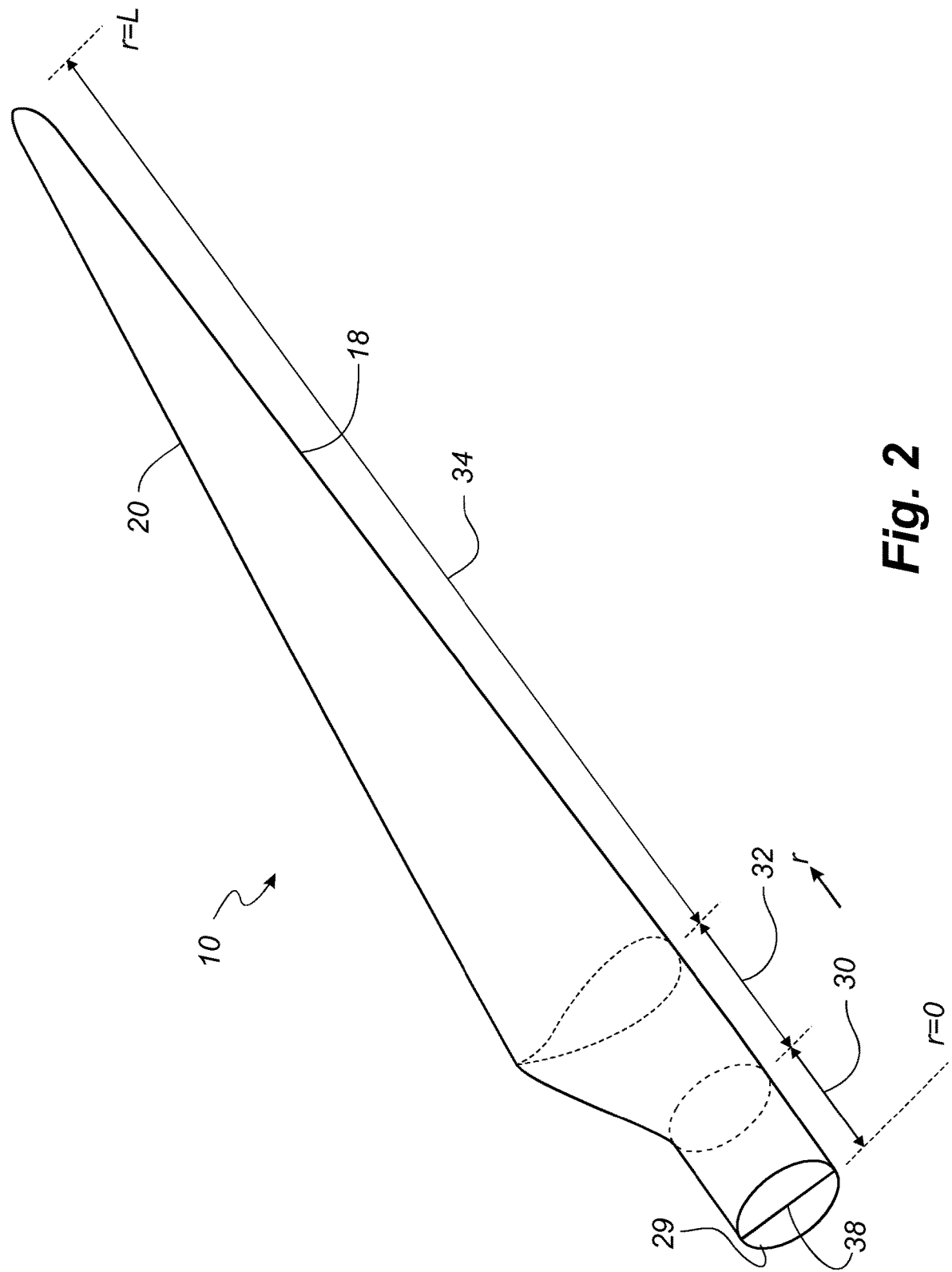
FIG. 2 is a diagrammatic perspective view of a wind turbine blade according to the invention.

FIG. 2 shows a schematic view of a of a wind turbine blade 10. The wind turbine blade 10 has the shape of a conventional wind turbine blade and comprises a root region 30 with a root end face 29 closest to the hub, a profiled or an airfoil region 34 farthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30, but often the transition towards the airfoil region starts close to the root end face 29. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

The blade is often made of two blade halves assembled by being glued or bolted together substantially along a chord plane 38 of the blade. It should be noted that the chord plane does not necessarily run straight over its entire extent, since the blade may be twisted and/or curved, thus providing a chord plane with a correspondingly twisted and/or curved course, this being most often the case in order to compensate for the local velocity of the blade being dependent on the radius from the hub. Due to the circular cross section, the root region 30 does not contribute to the production of the wind turbine and, in fact, it lowers the production slightly due to the drag.

Figure 3:
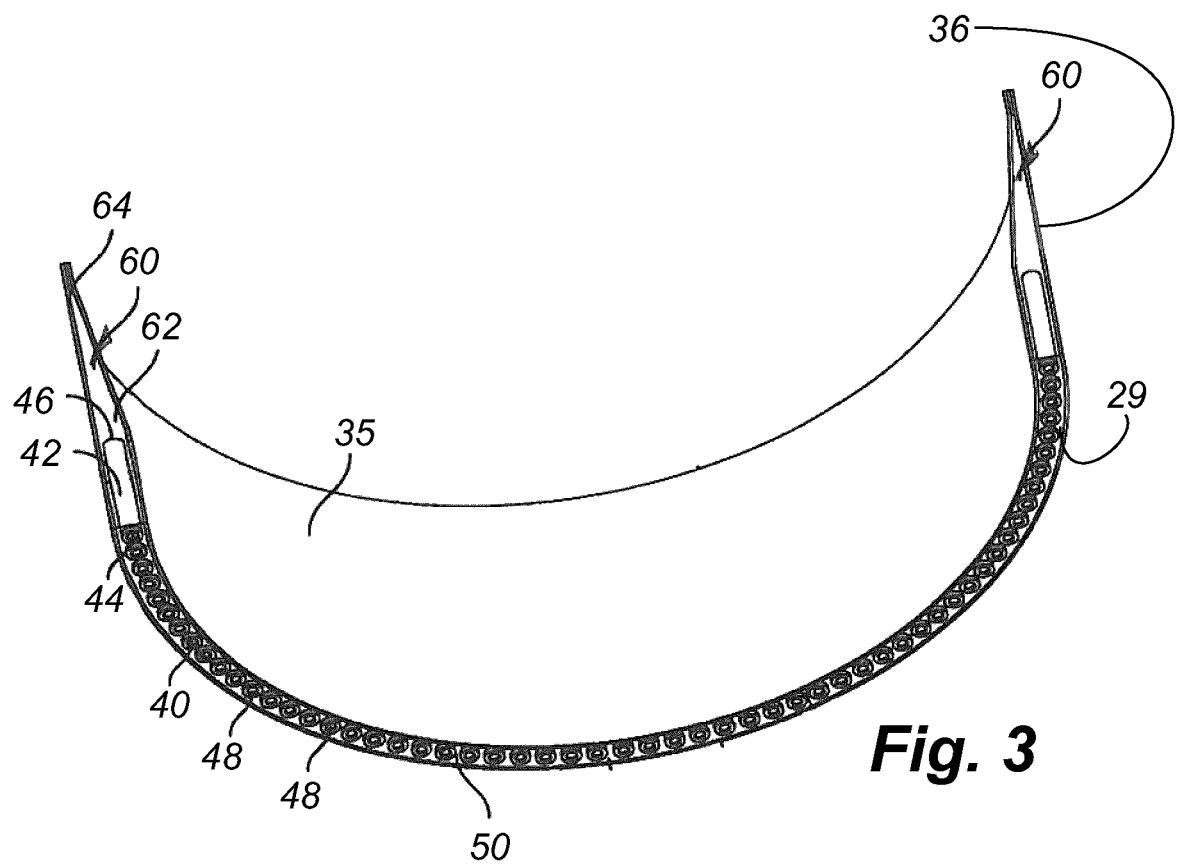
FIG. 3 is a perspective, sectional view of a portion of a root region of a wind turbine blade according to the invention.
Figure 4:
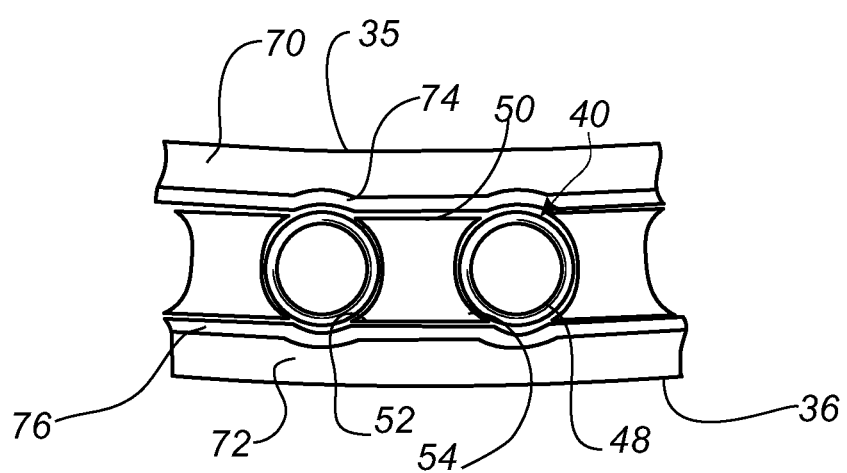
FIG. 4 is a longitudinal sectional view of a portion of the embodiment shown in FIG. 3.

As seen in FIGS. 3 and 4, the blade including the root region 30 is formed as a shell structure. The shell structure of the root region 30 is ring-shaped and comprises an outer surface 36 formed by an outer layer 72 of a fibre-reinforced polymer matrix advantageously of glass fibres and/or carbon fibres and a resin, such as epoxy, polyester or vinylester, and an oppositely arranged inner surface 35 formed by an inner layer 70 being made of the same material as the outer layer 72. Elongated fastening members 40 with fastening means 48 are placed between the layers 70, 72, optionally with an inner retaining layer 74 and outer retaining layer 76 in between. In the present invention, the elongated fastening members 40 are bushings having a bore for receiving a mounting bolt, and the bore comprises a threaded part 48 as fastening means. The bushing 40 comprises a first end (or proximal end) 44 and an oppositely arranged second end (or distal end) 46. The first end 44 of the bushing 40 is placed at the root end face 29 of the root region. The bushings 40 are arranged mutually spaced apart so as to substantially follow the circumference of the root region and allow access from the outside to the fastening means 48, i.e. the threads used for mounting the blade to the hub, e.g. via stay bolts. Seen relative to the root region, the outer periphery 42 of the fastening members 40 comprises an outer surface, an opposite inner surface, a first lateral face, and an opposite lateral face, as shown in FIG. 4.

Intermediate retaining means 50, e.g. made of a fibre-reinforced polymer, may be arranged in each region between adjacent interspaced lateral surfaces of the fastening members 40, i.e. in the present example between the bushings. Further, in the present embodiment the intermediate retaining means are formed of separately manufactured inserts 50. The inserts 50 may comprise a first insert part and a second insert part. The first insert part essentially corresponds to the region between the lateral faces of adjacent bushings 40 and is provided with opposite lateral faces 52, 54 formed complimentary to the lateral faces of the adjacent bushings 40, as shown in FIG. 4. The inserts 50 substantially extend up next to the adjacent bushings when seen in circumferential direction. Further, the first insert part extends from the first end of the bushings 40 and beyond the second end thereof. The second insert part is a wedge-shaped tapering extension of the first insert part. The first insert part may have an extent substantially corresponding to that of the bushings 40.

While the embodiment shown in FIGS. 3 and 4 comprises intermediate inserts 50, it is recognised that the blade root may be designed without such inserts. The bushings 40 may for instance be provided with a complimentary shape such that the neighbouring bushings 40 adjoin or abuts each other.

Figure 5:
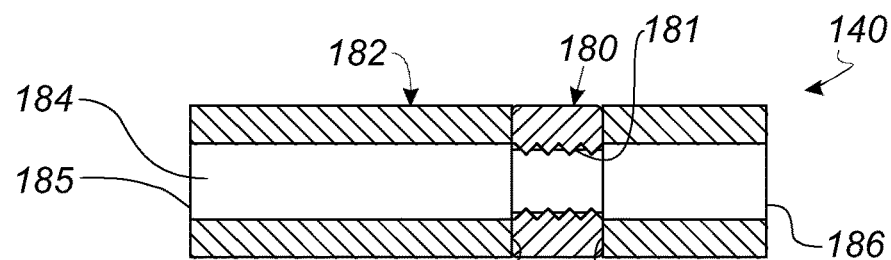
FIG. 5 shows a first embodiment of a bushing system according to the invention.

FIG. 5 shows a first embodiment of a wind turbine blade bushing system 140 according to the invention. The bushing system 140 is made up of at least two separately made parts comprising a threaded element 180 in form of a bolt-receiving nut having an internal thread 181 for obtaining a threaded connection with a mounting bolt or stay bolt for attaching the wind turbine blade to a blade bearing or pitch bearing at the hub of a wind turbine, and an anchor element 182, which bonds the bushing system 140 to the laminate structure of the wind turbine blade root. The anchor element 182 is provided with a through-going bore 184 between a first end 185 which is to be arranged proximal to the root end of the wind turbine blade and a second end to be arranged distal to the root end of the wind turbine blade. The anchor element 182 may advantageously be made of two separate pipes, which are attached to ends of the bolt-receiving nut 180, so that said nut 180 is retained between the two pipes via a first constraint 187 and a second constraint 188. The bolt-receiving nut 180 may for instance be attached to the two pipes via welding or soldering or any other suitable method. In an alternative embodiment, the anchor element 182 is made from a single pipe, and the bushing system 140 is manufactured by first arranging the bolt-receiving nut 180 in the interior of the bore 184 of the anchor element. The pipe is then press-formed or crimped next to the location of said nut 180 in order to form the first constriction 186 and/or the second constriction 187.

The bolt-receiving nut 180 is preferably made from a first material, and the anchor element 182 is made from a second material, where the first material has a higher strength or quality than the second material. The first material may for instance be a higher grade and harder steel, whereas the second material may be a lower grade and softer steel.

Since the threaded element 180 forms the primary interface with a mounting bolt, the use of a higher quality/strength material to form the threaded element 180 allows the bushing system to handle the transfer of the relatively high root end pulling forces to the mounting bolt, without risk of fracture or pull-out. The anchor element 182, by contrast, primarily acts to anchor the bushing system in the root end of the blade. As the anchoring effect is primarily dependent on the surface area between the anchor element 182 and the blade body and the bonding to the laminate structure of the wind turbine blade root, the use of a lower-quality material allows for the overall cost of the bushing system to be minimised, as the higher quality, relatively high-cost material can be used in that area of the bushing system where it is most effective, while the less critical function of anchoring the bushing system in a blade can be easily fulfilled through the use of a larger quantity of relatively low cost material.

Figure 6:
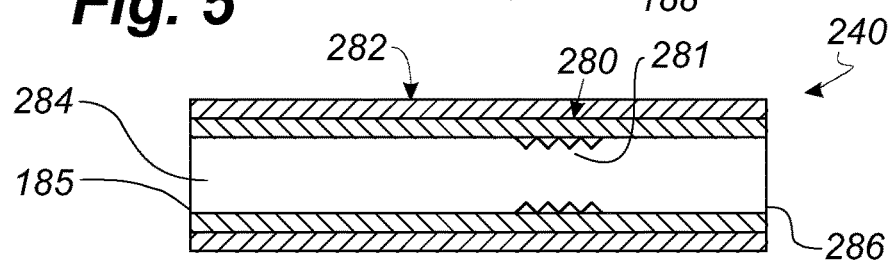
FIG. 6 shows a second embodiment of a bushing system according to the invention.

FIG. 6 shows a second embodiment of a wind turbine blade bushing system 240 according to the invention, wherein like reference numerals refer to like parts of the first embodiment. The bushing system comprises an anchoring part 282 and a threaded element 280 for establishing a threaded connection with a mounting bolt. In the shown embodiment, the bushing system 240 comprises a plurality of tubular members or pipes that combined make up layers of a thicker bushing. The anchoring to the surrounding laminate is primarily provided by the outer pipe. The inner threading 281 may be provided on an inner pipe. Alternatively, the threaded element may be provided as a bolt-receiving nut or collar which is either retained or constrained within the bore 284. This may for instance be achieved by providing two inner pipes that make the constraints and thus retain the threaded element between ends of the two inner pipes. Said collar or nut may also be connected to the pipes via a threaded connection. The individual pipes (i.e. outer, inner and possible intermediate pipes) may be fitted to each other via thermal fitting, a threaded connection, or any other suitable means. The use of standard pipes will lower the overall cost of the bushing system. Again, the threaded element 280 may be made from a first material, and the anchor element 282 may made from a second material, where the first material has a higher strength or quality than the second material.

Figure 7:
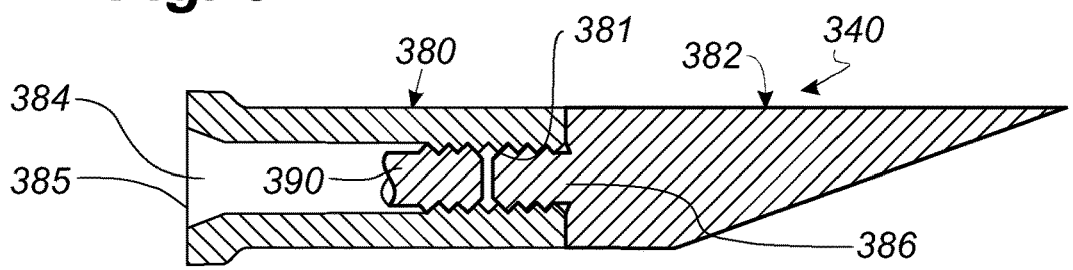
FIG. 7 shows a third embodiment of a bushing system according to the invention.

FIG. 7 shows a third embodiment of a wind turbine blade bushing system 340 according to the invention, wherein like reference numerals refer to like parts of the previous embodiments. The bushing system 340 comprises a threaded element 380 and an anchor element 382. The threaded element 380 comprises a through-going bore 384 between a first end 385 and a second end 386, and the bore 384 is provided with an inner thread 381 at the second end 386 of the threaded element 380. The anchor element 382 comprises a threaded spigot at a first end of the anchor element 380.

The internal thread 381 is arranged to receive at least a portion of a mounting bolt or stay bolt 390, and the internal thread is further arranged to receive at least a portion of the threaded spigot such that the anchor element 390 acts to at least partly retain the threaded element in the wind turbine blade.

The anchor element 382 further comprises a tapered or wedge-shaped part at a distal part of anchor element 382. The tapered or wedge-shaped part ensures that a smooth transition in stiffness is obtained in the longitudinal direction of the blade shell to the laminate of the wind turbine blade root.

Again, the threaded element 380 may be made from a first material, and the anchor element 382 may made from a second material, where the first material has a higher strength or quality than the second material.

Figure 8:
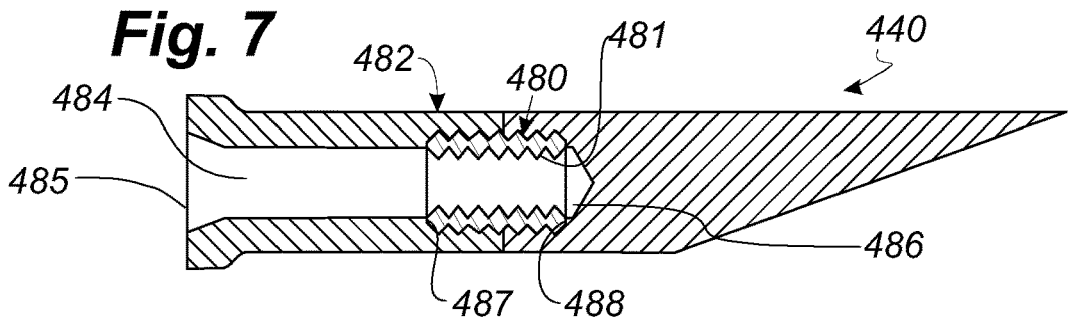
FIG. 8 shows a fourth embodiment of a bushing system according to the invention.

FIG. 8 shows a fourth embodiment of a wind turbine blade bushing system 440 according to the invention, wherein like reference numerals refer to like parts of the previous embodiments. The bushing system 440 comprises an anchor element 482 and a threaded element 482 in form of a bolt-receiving nut or collar having an inner thread 481 for establishing a threaded connection with a mounting bolt. The anchor element 482 comprises a first portion and a second portion, the first portion substantially comprising a tubular element having an inner through bore 484 extending between a first end 485 and a second end 486. The second portion substantially comprises a tapered or wedge-shaped element. The first portion and said second portion are joined to form an anchor element 482. The first portion and said second portion may advantageously be joined via or at said nut or collar 480, e.g. via a threaded connection. Accordingly, the anchoring element 482 is assembled from two separately manufactured and preferably standard products. The two parts may be assembled such that the assembly retains the bolt-receiving nut 480 and/or said nut 480 provides the assembly of the two parts. Further, the two portions may provide a first constriction 487 and a second constriction 488 so that the bolt-receiving nut 480 is retained in a cavity formed between said two portions.

Again, the threaded element 480 may be made from a first material, and the anchor element 482 may made from a second material, where the first material has a higher strength or quality than the second material.

Figure 9:
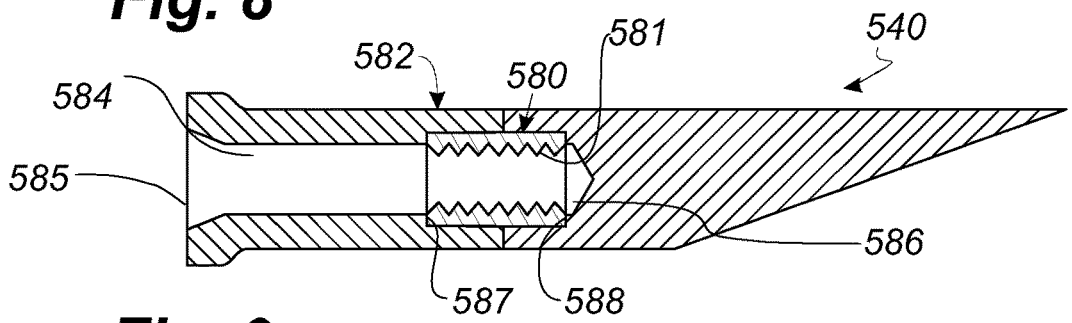
FIG. 9 shows a fifth embodiment of a bushing system according to the invention.

FIG. 9 shows a fifth embodiment of a wind turbine blade bushing system 540 according to the invention, wherein like reference numerals refer to like parts of the fourth embodiment. The embodiment shown differs from the fourth embodiment in that the connection between the two portions of the anchor element 580 and the threaded element 580 is provided by a thermal shrink fit or similar process to retain the threaded element 580 in a cavity formed between the two portions.

Figure 10:
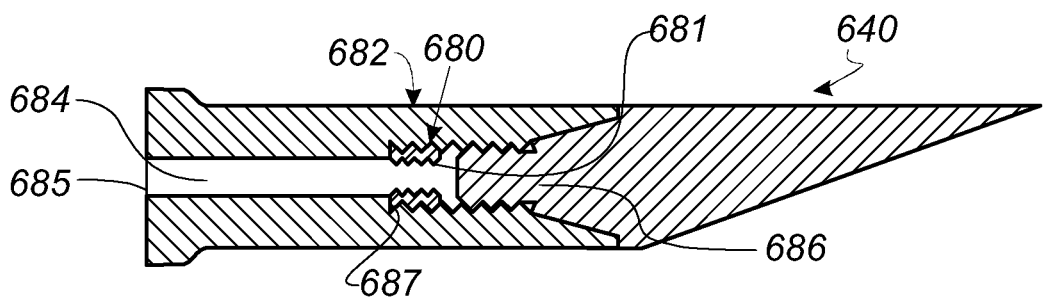
FIG. 10 shows a sixth embodiment of a bushing system according to the invention.

FIG. 10 shows a sixth embodiment of a wind turbine blade bushing system 640 according to the invention, wherein like reference numerals refer to like parts of the previous embodiments. The bushing system 640 comprises an anchor element 682 and a threaded element 682 in form of a bolt-receiving nut or collar having an inner thread 681 for establishing a threaded connection with a mounting bolt. The anchor element 682 comprises a first portion and a second portion, the first portion substantially comprising a tubular element having an inner through bore 684 extending between a first end 685 and a second end 686. The second portion substantially comprises a tapered or wedge-shaped element. The bore 684 of the first portion comprises an inner thread, and the second portion is connected to said inner thread via a threaded male part such that the first portion and said second portion are joined to form 682 anchor element.

The threaded element 680 is also connected via a threaded connection to the inner thread of the bore of the first portion. The bore may further comprise a constraint 687 such as to further retain the threaded part 680 in the anchor part 682 and the wind turbine blade.

Again, the threaded element 680 may be made from a first material, and the anchor element 682 may made from a second material, where the first material has a higher strength or quality than the second material.

While the embodiments shown in FIGS. 5-10 are shown with an apparent smooth exterior surface, it is recognised that the bushing system may comprise an external surface, provided with a surface effect to improve the retention of said bushing system in the root end of a wind turbine blade. The surface effect may comprise any combination of grooves, undulations, threads, corrugations, ribs, or ripples on the external surface of the bushing system. The surface effect is preferably made to the anchor element.

Figure 11:
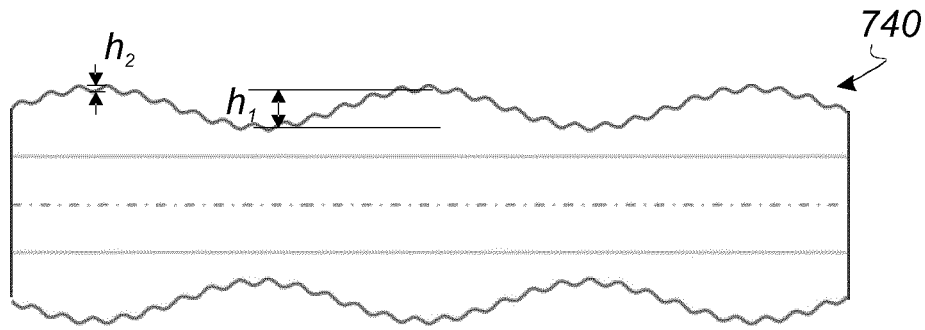
FIG. 11 shows a seventh embodiment of a bushing system according to the invention.

The invention also provides a wind turbine blade bushing 740 as shown in FIG. 11. The bushing 740 is provided with a surface effect in form of a shaped cross-sectional profile on the external surface, wherein a first series of undulations having a first spatial frequency are provided on the external surface of the bushing, and wherein said first series of undulations are modulated with a second series of undulations having a second spatial frequency, said second spatial frequency being higher than said first spatial frequency. This embodiment provides a better anchoring in the surrounding laminate structure of the root section of the wind turbine blade. The height or amplitude of the first series of undulations are advantageously at least the same size as a height or amplitude of the second series of undulations. This surface effect may be combined with any of the aforementioned embodiments or with any prior art bushings. Accordingly, it is seen that the novel surface effect provides a generic idea. The shown wind turbine blade bushing 740 is depicted without an internal thread in the bore, however, it is recognised that such a thread may be provided in order to provide a threaded connection to a mounting bolt.

Figure 12:
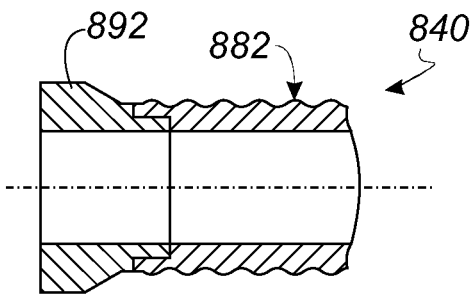
FIG. 12 shows an eighth embodiment of a bushing system according to the invention.

The invention also provides a wind turbine blade bushing system 840 as shown in FIG. 12. In this embodiment, a separately manufactured bushing mouth 892 is made as an insert to an anchor element 882 of the bushing system. The bushing mouth may be made from a higher grade or harder material than the anchor element 882. Thus, a bushing system 840 is provided with a bushing mouth of a high-grade material, whereas post milling operations or the like may more easily be carried out on the material of the anchor element 882. The bushing mouth may be combined with any of the afore-mentioned embodiments or with prior art bushings, e.g. as a blade bushing system comprising three or more pieces and comprising a bushing mouth, a cylindrical tube and a threaded transition part.

The bushings and intermediate inserts are often pre-arranged on a root plate. This may be carried out by first arranging a number of outer layers, after which the bushings and inserts are arranged on the outer layers via the root plate. Finally a number of inner layers are arranged on top of the bushings and inserts, cf. also the layout shown in FIGS. 3 and 4. This process is known in the art.

Figures 13A, 13B:
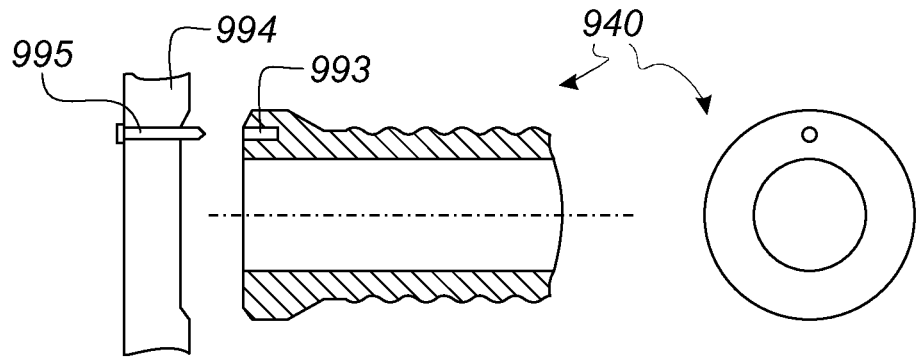
FIG. 13 shows a ninth embodiment of a bushing system according to the invention.

FIGS. 13*a* and 13*b* show a side view and end view of a bushing 940 that is particularly advantageous for the above layout method using a root plate. In this embodiment an end face of the bushing 940 is provided with an alignment bore. A corresponding bore is provided in a root plate 994, and the bushing may thus be aligned in a correct angular position on the root plate 994 by use of an alignment pin 995 inserted through the bore of the root plate 994 and into the alignment bore 993 of the bushing 940. This embodiment may be combined with any of the afore-mentioned embodiments or prior art bushings.

Figure 14:
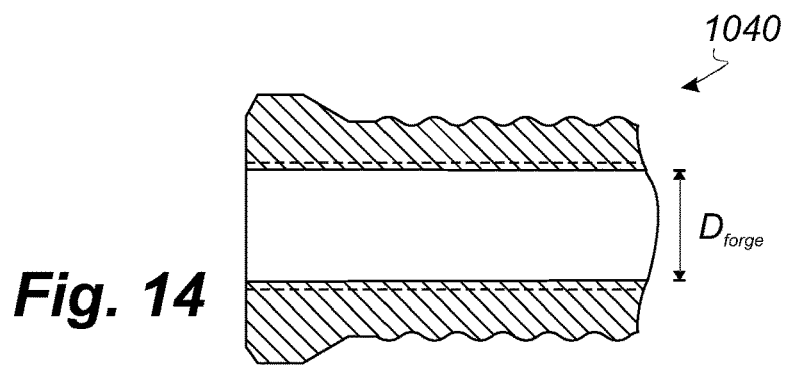
FIG. 14 illustrates a first embodiment for manufacturing a bushing system.

The invention also provides two manufacturing methods that minimise the manufacturing costs by reducing the amount of scrap compared to the prior art manufacturing methods, where the bushings are manufactured from relatively bulky blanks. A first embodiment for manufacturing a bushing 1040 is illustrated in FIG. 14. The bushing is manufactured by first forging a template having a little extra material than the final bushing. The diameter $D_{forge}$ of the bore is chosen to follow maximum material conditions. The diameter may for instance be chosen as the minimum diameter of the inner thread, which is to provide the threaded connection to a mounting bolt. A later minimum machining is carried out to remove the extra material in the bore. The surface treatment such as providing the exterior of the bushing with corrugations may be carried out via the forging process. Thus, no post machining is necessary to the exterior of the forged template.

Figure 15:
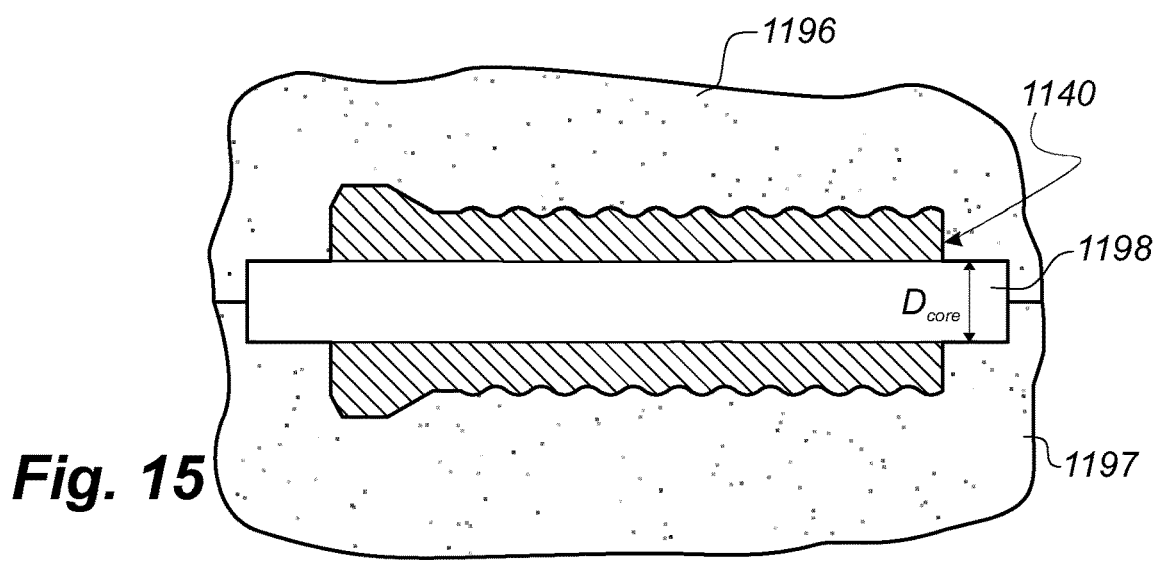
FIG. 15 illustrates a second embodiment for manufacturing a bushing system.

A second embodiment for manufacturing a bushing 1140 is illustrated in FIG. 15. In this embodiment the bushing is manufactured by first casting a template by use of outer mould parts 1196, 1197 and a mould core part 1198. The outer mould parts 1196, 1197 may be used to cast the exterior surface of the template. The surface treatment such as providing the exterior of the bushing with corrugations may be carried out via the shape of the outer mould parts 1196, 1197. Thus, no post machining is necessary to the exterior of the forged template. The diameter $D_{core}$ of the mould core part 198 is chosen to provide a through-going bore which follows maximum material conditions. The diameter may for instance be chosen as the minimum diameter of the inner thread, which is to provide the threaded connection to a mounting bolt. A later minimum machining is carried out to remove the extra material in the bore.

Figure 16A:
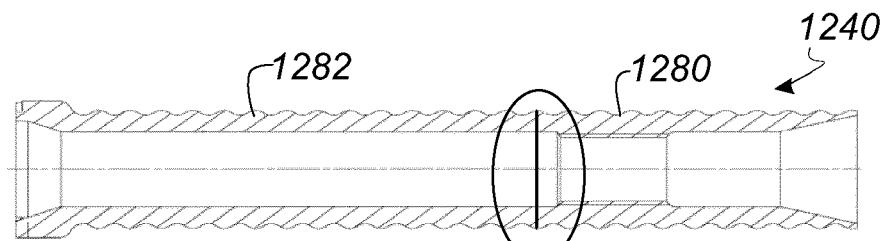
FIG. 16 shows one embodiment of a bushing system according to the invention.
Figure 16B:
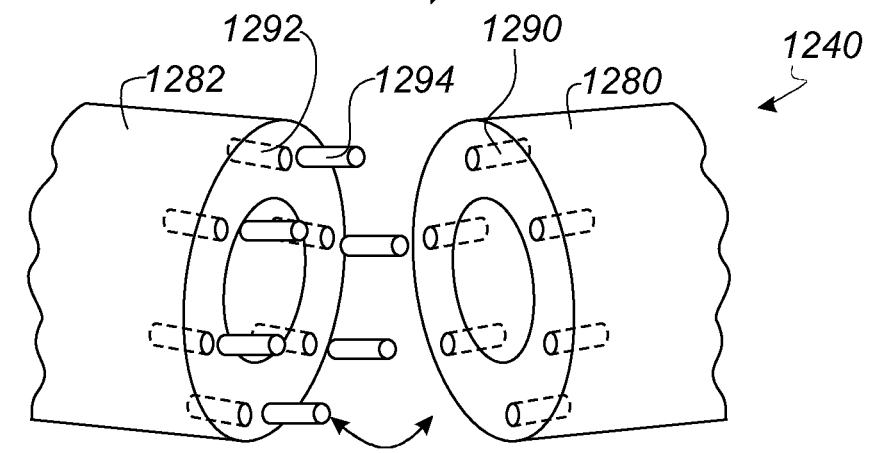

FIGS. 16*a* and 16*b* illustrate an embodiment of a sectionised bushing system 1240 according to the invention. The bushing system 1240 comprises a first longitudinal part 1280 in form of a threaded element for retaining a mounting bolt, and a second longitudinal part 1282, which forms part of the anchor element. The first longitudinal part 1280 comprises a plurality of bores 1290 at an end face thereof, and the second longitudinal part 1282 comprises a plurality of bores 1292 at an end face thereof. The two longitudinal parts 1280, 1282 are connected via pins 1294 that are connected to the bores 1290, 1292 of said end faces. The pin and bore connection may for instance provide an interference fit or a friction fit, which fastens the two longitudinal parts 1280, 1282. This provides a modular bushing system, where for instance the threaded element may be a standard component, whereas the anchor element may be customised to the particular wind turbine blade type. Again, the threaded element 1280 may be made from a first material, and the anchor element 1282 may be made from a second material, where the first material has a higher strength or quality than the second material.

Figure 17A:
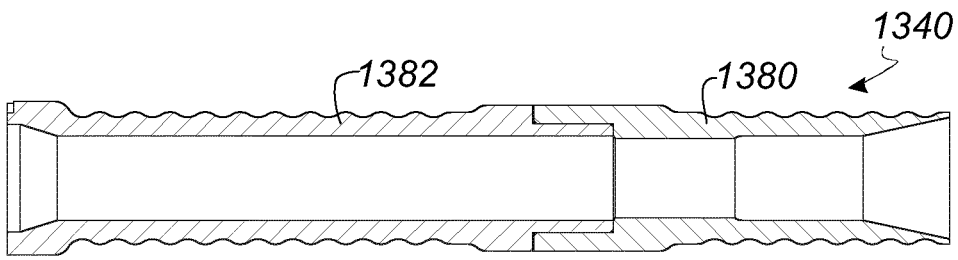
FIG. 17 shows another embodiment of a bushing system according to the invention.
Figure 17B:
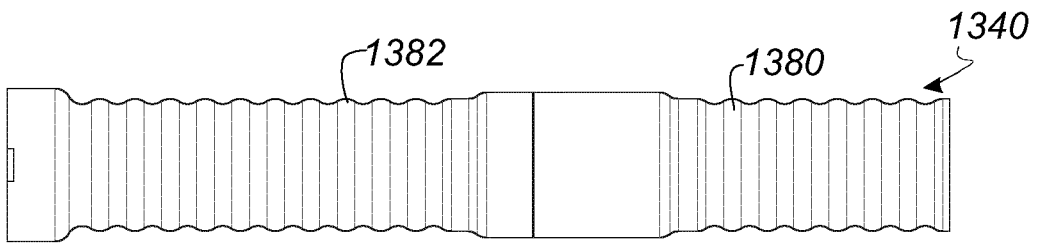

FIGS. 17*a* and 17*b* illustrate an embodiment of a sectionised bushing system 1340 according to the invention. The bushing system 1340 comprises a first longitudinal part 1380 in form of a threaded element for retaining a mounting bolt, and a second longitudinal part 1382, which forms part of the anchor element. The two longitudinal parts 1380, 1382 are connected via a socket connection, and the bushing system may as shown in FIG. 17*b* have a local thickening at the connection. This also provides a modular bushing system, where for instance the threaded element may be a standard component, whereas the anchor element may be customised to the particular wind turbine blade type. Again, the threaded element 1380 may be made from a first material, and the anchor element 1382 may be made from a second material, where the first material has a higher strength or quality than the second material.

In the embodiments shown in FIGS. 16 and 17, the connection between the longitudinal parts may advantageously be located near the threaded part.

Figure 18A:
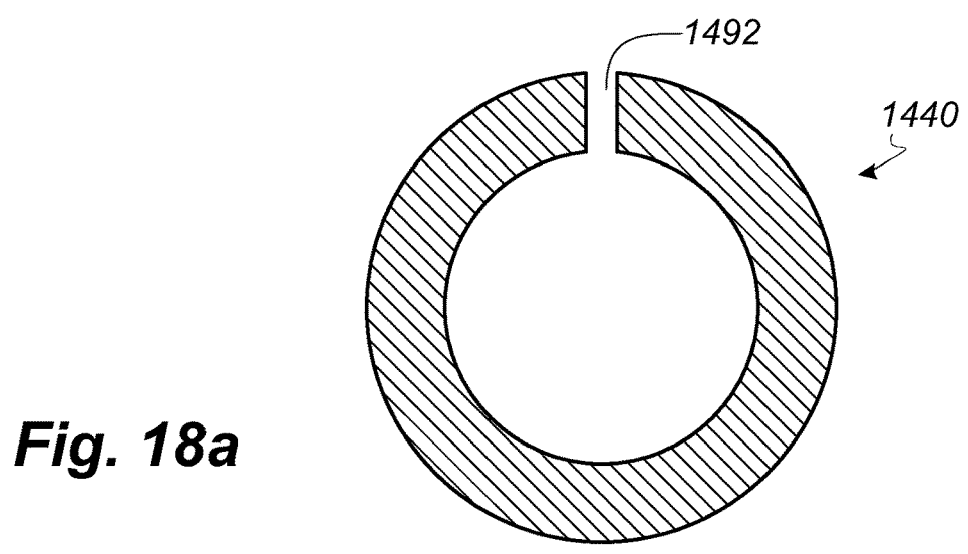
FIG. 18 shows yet another embodiment of a bushing system according to the invention.
Figure 18B:
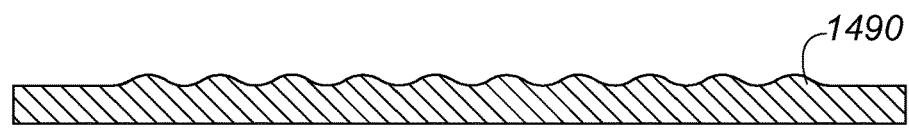

FIG. 18*a* illustrates a cross-section through bushing system 1440, which is made from a sheet material 1490 with application of a rolling process. The bushing system 1440 may for instance be manufactured according to the following process. The sheet may be formed from a billet. Then a tubular element is formed by rolling said sheets. Subsequently a thread may be drilled or tapped in the interior of said tubular element. The sheet 1490 may as shown be formed with an exterior surface effect, such as corrugations, in order to improve an anchoring effect to the wind turbine blade root. This can for instance be carried out by a plate being rolled with stepped or different size rollers. This embodiment provides a very simple and inexpensive method of manufacturing a bushing system. The bushing system 1440 may have a slit 1492, which extends in the longitudinal direction of the bushing system. It may be advantageous to seal the slit before the bushing system is embedded in the composite blade root so that resin does not flow into the bushing system during the infusion process. The slit 1492 may extend at the same angular position along the entire longitudinal extent of the bushing system 1440. Alternatively, the sheet material may be rolled such that the angular position of the slit 1492 varies in the longitudinal direction of the blade.

The invention has been described with reference to preferred embodiments. However, the scope of the invention is not limited to the illustrated embodiments, and alterations and modifications may be carried out without deviating from the scope of the invention, which is defined by the following claims.

| List of reference numerals | |
|---|---|
| 2 | wind turbine |
| 4 | tower |
| 6 | nacelle |
| 8 | hub |
| 10 | blade |
| 14 | blade tip |
| 16 | blade root |
| 18 | leading edge |
| 20 | trailing edge |
| 22 | pitch axis |
| 29 | root end face |
| 30 | root region |
| 32 | transition region |
| 34 | airfoil region |
| 35 | inner surface of root region |
| 36 | outer surface of root region |
| 38 | chord plane |
| 40 | fastening member, bushing |
| 42 | outer periphery of fastening member |
| 44 | first end of fastening member |
| 46 | second end of fastening member |
| 48 | fastening means, threaded bore |
| 50 | insert |
| 52 | first lateral face of insert |
| 54 | second lateral face of insert |
| 60 | wedge-shaped element |
| 62 | first end of wedge-shaped element |
| 64 | second end of wedge-shaped element |
| 70 | inner layer |
| 72 | outer layer |
| 140, 240, 340, 440, 540, 640, 740, 840, 940, 1040, 1140, 1240, 1340, 1440 | Bushing system |
| 180, 280, 380, 480, 580, 680, 1280, 1380 | threaded element/bolt-receiving nut |
| 181, 281, 381, 481, 581, 681 | internal thread |
| 182, 282, 382, 482, 582, 682, 882, 1282, 1382 | anchor element |
| 184, 284, 384, 484, 584, 684 | Bore |
| 185, 285, 385, 485, 585, 685 | first end/proximal end |
| 186, 286, 386, 486, 586, 686 | second end/distal end |
| 187, 487, 587, 687 | first constriction |
| 188, 488, 588 | second constriction |
| 390 | mounting bolt/stay bolt |
| 892 | bushing mouth |
| 993 | alignment bore |
| 994 | root plate |
| 995 | alignment pin |
| 1196, 1197 | outer mould parts |
| 1198 | mould core part |
| 1290, 1292 | bores |
| 1294 | pins |
| 1490 | sheet material |
| 1492 | slit |
| r | local radius, radial distance from blade root |
| L | blade length |

The invention claimed is:

1. A wind turbine blade bushing system for arrangement in a root end of a wind turbine blade, the wind turbine blade bushing system comprising:
a threaded element for retaining a mounting bolt for a wind turbine blade, the threaded element being formed from a first material, wherein the threaded element is a bolt-receiving nut for receiving the mounting bolt for the wind turbine blade; and
an anchor element for arrangement proximal to a root end face of the root end of the wind turbine blade, wherein the anchor element retains the threaded element in the wind turbine blade and anchors the wind turbine blade bushing system in the root end face of the root end of the wind turbine blade, the anchor element being formed from a second material, the anchor element extending from the root end face to a longitudinal position distal to the root end face, and wherein the anchor element comprises a tubular member for arrangement at the root end of the wind turbine blade to retain the tubular member in a wind turbine blade body, wherein the tubular member acts to at least partly retain the bolt-receiving nut in the wind turbine blade,
wherein the tubular member comprises a first open end to receive a bolt, an internal chamber of the tubular member comprising a first constriction between a location of the bolt-receiving nut in the tubular member and the first open end so as to retain the bolt-receiving nut in the tubular member, the first constriction being sized and contoured to mate with an outer surface of the threaded element,
wherein the tubular member further comprises a second end positioned opposite the first open end, the internal chamber of the tubular member further comprising a second constriction between the location of the bolt-receiving nut in the tubular member and the second end so as to retain the bolt-receiving nut in place relative to the second end of the tubular member, the second constriction being sized and contoured to mate with the outer surface of the threaded element, and
wherein the first material has a higher strength and higher fracture toughness than the second material.

2. The wind turbine blade bushing system according to claim 1, wherein the bolt-receiving nut is arranged in an interior part of the tubular member.

3. The wind turbine blade bushing system according to claim 1, wherein the bolt-receiving nut is retained in the tubular member by the tubular member being crimped or press-formed in a region of said tubular member to retain the bolt-receiving nut at said region.

4. The wind turbine blade bushing system according to claim 1, wherein the first constriction is threaded.

5. The wind turbine blade bushing system according to claim 1, wherein the second constriction is threaded.

6. The wind turbine blade bushing system according to claim 1, wherein the tubular member is an open-ended pipe element.

7. The wind turbine blade bushing system according to claim 1, wherein a tapered or wedge-shaped element is arranged at a distal part of the tubular member.

* * * * *